United States Patent [19]

Radnich

[11] Patent Number: 4,991,807
[45] Date of Patent: Feb. 12, 1991

[54] SOAP DISH TEMPORARY SUPPORT MECHANISM

[76] Inventor: James J. Radnich, HC-1 Box 1092, Joshua Tree, Calif. 92252

[21] Appl. No.: 437,119

[22] Filed: Nov. 16, 1989

[51] Int. Cl.⁵ .............................................. F16B 47/00
[52] U.S. Cl. .................................. 248/206.3; 269/95; 269/287; 269/904
[58] Field of Search ................ 248/206.3, 206.2, 683, 248/362, 363, 506, 205.5, 205.6, 205.7, 205.8, 205.9, 206.1, 206.4, 206; 269/95, 904, 287

[56] References Cited

U.S. PATENT DOCUMENTS

| 566,816 | 9/1896 | Taylor et al. | |
|---|---|---|---|
| 1,530,784 | 3/1925 | Midgley . | |
| 1,905,069 | 4/1933 | Stair | 248/206.3 |
| 1,981,389 | 11/1934 | Roberts et al. | 248/206.3 X |
| 2,044,520 | 6/1936 | Weiant | 248/206 |
| 2,367,161 | 1/1945 | Wild | 248/206.3 |
| 2,642,603 | 6/1953 | Mills | 248/206.3 X |
| 2,650,698 | 9/1953 | Castner | 206/81 |
| 2,717,472 | 9/1955 | Wilmington | 45/28 |
| 2,871,615 | 2/1959 | Borah | 45/28 |
| 2,896,363 | 7/1959 | Litzaw | 45/28 |
| 3,137,086 | 6/1964 | James | 248/206.3 |
| 3,155,238 | 11/1964 | Bennett | 211/60 |
| 4,197,616 | 4/1980 | Panuski | 24/73 R |

FOREIGN PATENT DOCUMENTS

| 0680862 | 9/1939 | Fed. Rep. of Germany | 248/206.4 |
|---|---|---|---|
| 1016325 | 11/1952 | France | 248/205.7 |

Primary Examiner—Ramon O. Ramirez
Attorney, Agent, or Firm—Harvey S. Hertz

[57] ABSTRACT

A soap dish temporary securing mechanism for holding a soap dish having a horizontal soap support section adjacent a wall until the adhesive attaching the soap dish to the wall dries. The soap dish securing mechanism is formed of a sling having a horizontal slot formed therein for holding the soap dish horizontal support section therein. A securing mechanism is attached to the sling for attaching the sling to the wall surface on opposite sides of the soap dish.

1 Claim, 1 Drawing Sheet

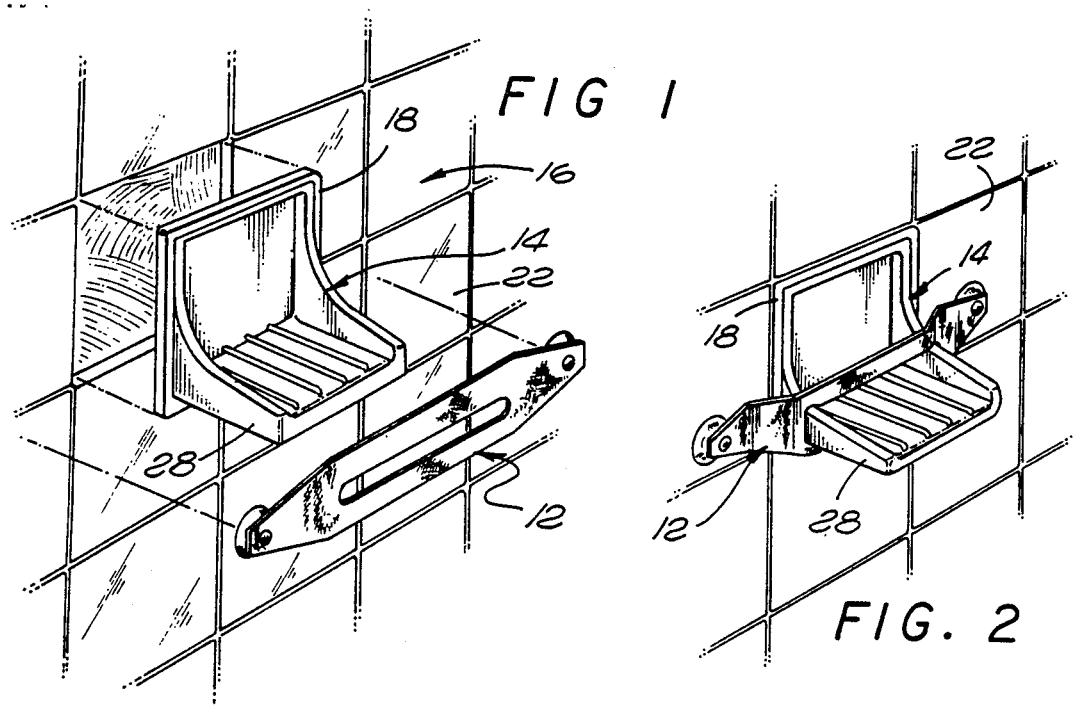
FIG 1
FIG. 2
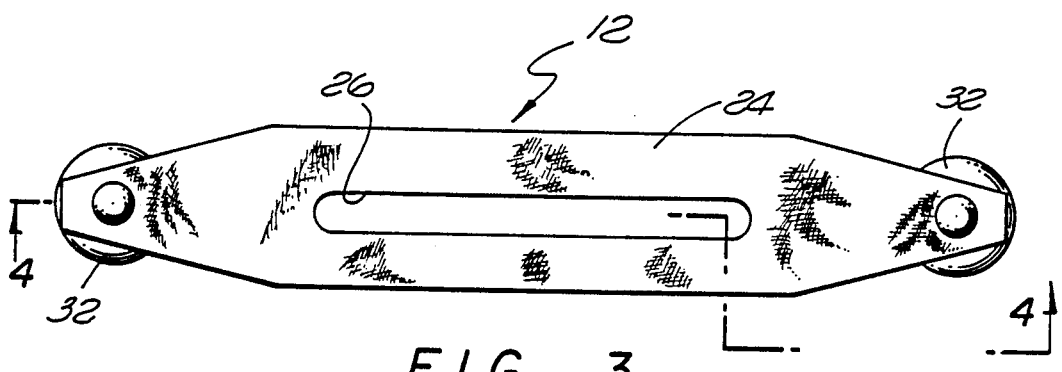
FIG. 3
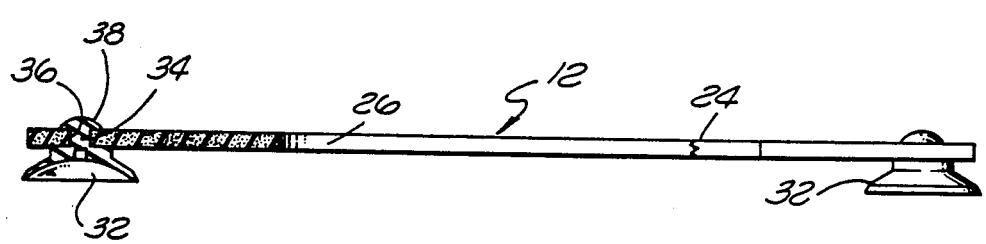
FIG. 4

SOAP DISH TEMPORARY SUPPORT MECHANISM

BACKGROUND OF THE INVENTION

1. Field of the Invention

The field of art to which the invention pertains includes temporary securing mechanisms and, more particularly, to a soap dish securing mechanism for securing the soap dish to a wall until the adhesive used to secure the soap dish to the wall dries and forms a permanent bond with the wall.

2. Description of the Prior Art

Conventional techniques for securing a soap dish to a wall, typically a tile wall as in a bathtub, includes utilizing strips of masking tape to hold the soap dish in place until the adhesive used to secure the soap dish to the wall sets. Thereafter, the masking tape is removed.

It has been found that the masking tape does not contain sufficient strength to hold the soap dish to the wall for the prerequisite time. In addition, the masking tape can cause damage to the adjacent tiles to which they are secured, especially upon the removal of the masking tape.

Other known prior art includes U.S. Pat. Nos. 3,137,086; 2,044,520; 2,896,363; 1,905,069; 2,650,698; 2,717,472; 2,642,603; 2,871,615 and 2,367,161.

SUMMARY OF THE INVENTION

The present invention provides a soap dish temporary securing mechanism for holding a section of the soap dish having a horizontal support section adjacent a wall until the adhesive attaching the soap dish to the wall dries. The apparatus includes a sling having a horizontal slot formed therein for holding the soap dish horizontal support section therein. The sling is secured to the adjacent wall surface on opposite of the soap dish.

The advantages of this invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a prospective view illustrating the soap dish securing mechanism and a typical soap dish;

FIG. 2 is a prospective view of the securing mechanism secured to the wall and holding the soap dish in place;

FIG. 3 is a front plan view of the securing mechanism of FIG. 1; and

FIG. 4 is a top plan view, partially in section, of the securing mechanism of FIG. 3.

DETAILED DESCRIPTION

Referring now to the drawings, there is shown in FIG. 1 a soap dish securing mechanism 12 constructed in accordance with principles of the invention. The securing mechanism 12 is utilized to secure a soap dish 14 to a wall 16. In normal installation, the soap dish 14 contains a vertical backing member 16 which is placed against the wall by applying a coat of tile adhesive to the rear surface of the vertical backing member 18. Typically, the soap dish 14 replaces one of the tiles 22 shown already mounted on the wall 16. Of course, should the vertical backing section 18 be greater or less than a tile, it is necessary to remove a portion of one of the adjacent tiles.

As illustrated in FIG. 2, the soap dish securing mechanism 12 is utilized to hold the soap dish 14 in place until the adhesive sets. Typically, at least 24 hours is required for the adhesive to dry thoroughly. Thereafter, the tile joints are sealed with a tile grout.

The soap dish securing mechanism 12 is shown in greater detail in FIGS. 3 and 4 and includes a sling 24 formed of rubber or other "wet suit" type of stretchable material. A slot 26 is formed in the sling 24 and is of sufficient size so that the horizontal soap support section 28 of the soap dish 14 will pass therethrough, yet is small enough that the portion of the sling 24 defining the slot 26 is juxtaposed with the horizontal soap support section and forms a support. The sling 24 then tapers at its end and contains a pair of suction cups 32, one of which are attached at each end to the sling. The suction cups 32 contain shaft portions 34 which pass through apertures 36 in the sling and are secured to the sling by means of an enlarged ball portion formed at the end of the shaft.

Once the soap dish 14 has been positioned against the wall 16, the sling 24 is positioned onto the horizontal soap support section 28 as shown in FIG. 2 and the suction cups 32 fastened to the adjacent tiles of the wall. When the adhesive has set, the suction cups are removed from the adjacent tiles and the securing mechanism 12 removed from the soap dish 4.

I claim:

1. A soap dish temporary securing mechanism for holding a soap dish having a horizontal soap support section, said soap dish being secured to said wall by adhesive and being aided in being held in place by said securing mechanism until said adhesive dries, comprising:

a sling formed of stretchable material having a horizontal slot formed therein enclosing said soap dish horizontal support section for supporting and holding said soap dish horizontal soap support section positioned in said slot; and securing means attached to said sling for attaching said sling to the wall surface on opposite sides of said soap dish comprising suction cups removable from said sling, said suction cups containing shafts which pass through apertures in said sling which are spaced from said slot.

* * * * *